United States Patent [19]
Burgdorf et al.

[11] Patent Number: 5,417,485
[45] Date of Patent: May 23, 1995

[54] BRAKE CONTROLLER WITH EACH VALVE CONNECTED TO TWO SEPARATE ELECTRICAL CIRCUITS

[75] Inventors: Jochen Burgdorf, Offenbach-Rumpenheim; Peter Kauschka, Bad Soden, both of Germany

[73] Assignee: Alfred Teves GmbH, Frankfurt Am Main, Germany

[21] Appl. No.: 980,805

[22] PCT Filed: May 14, 1992

[86] PCT No.: PCT/EP92/01066

§ 371 Date: Jul. 15, 1993

§ 102(e) Date: Jul. 15, 1993

[87] PCT Pub. No.: WO93/00238

PCT Pub. Date: Jan. 7, 1993

[30] Foreign Application Priority Data

Jun. 29, 1991 [DE] Germany .................. 41 21 581.8

[51] Int. Cl.⁶ .................. B60T 8/26; B60T 8/96; B60T 8/36
[52] U.S. Cl. .................. 303/119.1; 303/20
[58] Field of Search .................. 303/9.63, 15, 20, 92, 303/95, 103, 113.1, 113.5, 116.1, 119.1, DIG. 3, DIG. 4, 99

[56] References Cited

U.S. PATENT DOCUMENTS

| | | | |
|---|---|---|---|
| 3,862,781 | 1/1975 | King et al. | 303/DIG. 3 X |
| 4,093,313 | 6/1978 | Burckhardt | 303/DIG. 4 X |
| 4,482,192 | 11/1984 | Leiber | 303/119.1 X |
| 4,802,710 | 2/1989 | Burgdorf et al. | 303/11 |
| 5,000,520 | 3/1991 | Schmitt | 303/DIG. 3 X |

FOREIGN PATENT DOCUMENTS

| | | | |
|---|---|---|---|
| 2605573 | 4/1988 | France . | |
| 1961039 | 6/1971 | Germany . | |
| 2625713 | 12/1977 | Germany . | |
| 2832245 | 1/1980 | Germany . | |
| 3240275 | 5/1984 | Germany . | |
| 3337800 | 5/1984 | Germany . | |
| 4036940 | 8/1991 | Germany . | |
| 4022481 | 10/1991 | Germany . | |
| 2134200 | 8/1984 | United Kingdom . | |
| 2160273 | 12/1985 | United Kingdom | 303/119.1 |

*Primary Examiner*—Josie A. Ballato
*Attorney, Agent, or Firm*—Ratner & Prestia

[57] ABSTRACT

A brake system having inlet valves in brake lines between the master brake cylinder and the wheel brakes of the rear axle. The inlet valves are driven via a first current circuit by an electronic analyzing and controlling unit, so that both an ideal brake force distribution is achieved and locking of the wheels is prevented. In order to avoid excessive braking of the rear wheels upon malfunction of the control unit, a second current circuit is provided which comprises a pressure switch responding to the master cylinder pressure. The two current circuits are actuated optionally by way of a relay.

10 Claims, 1 Drawing Sheet

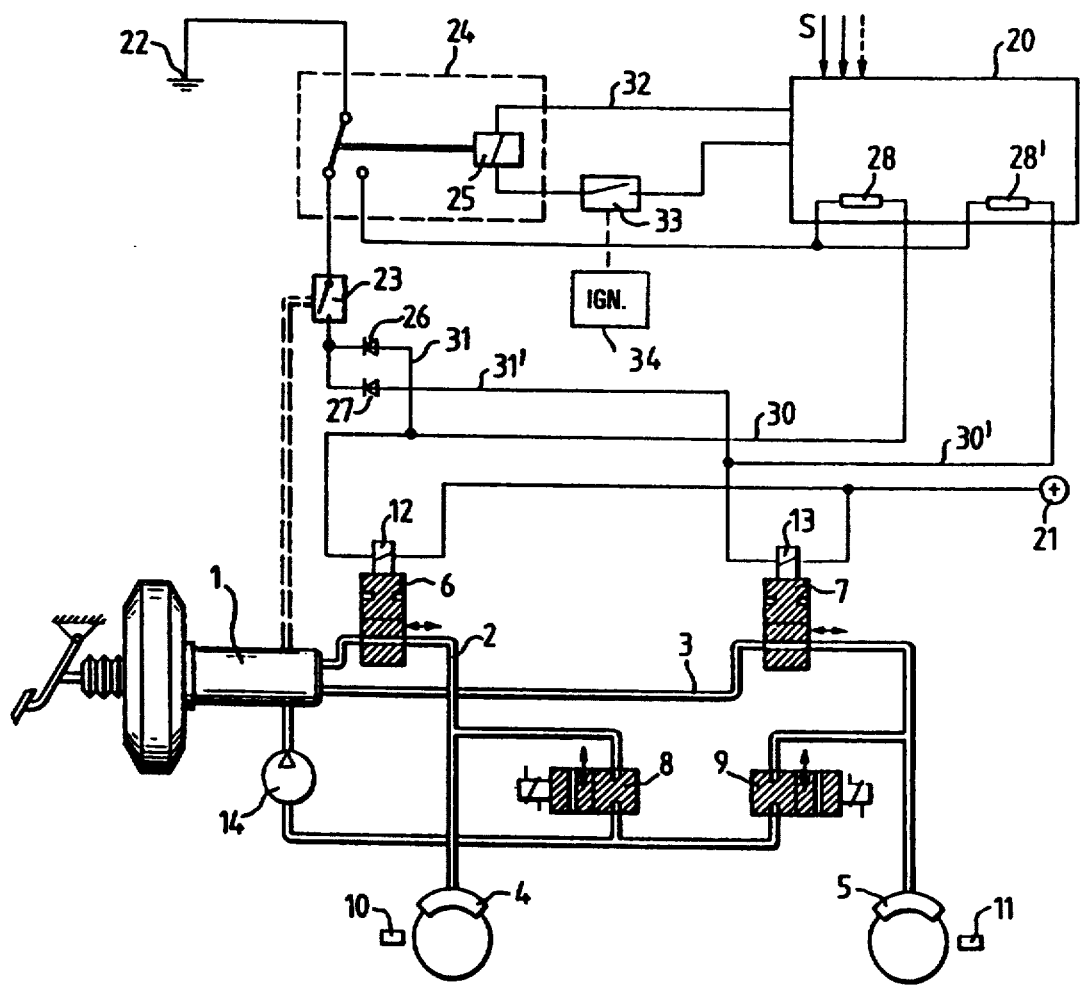

BRAKE CONTROLLER WITH EACH VALVE CONNECTED TO TWO SEPARATE ELECTRICAL CIRCUITS

TECHNICAL FIELD

The present invention relates to a brake system for an automotive vehicle with means for controlling the braking pressure.

BACKGROUND OF THE INVENTION

When a vehicle is braked, the brake forces introduced into the wheels cause a torque about the center of gravity of the vehicle. This results in an increase of the front-wheel load and a decrease of the rear-wheel load. Therefore, higher brake forces can occur at the front wheels than at the rear wheels. This has to be taken into consideration when dimensioning brake system. In the most simple case, the pressure which develops in the brake system is conducted to differently sized large surfaces, resulting in a linear relation between the brake forces at the front axle and at the rear axle. This relation is chosen such that, when a locking of the wheels cannot be avoided, first the front wheels and then the rear wheels will lock. This measure enhances considerably the directional stability of the vehicle during braking.

The desired brake force on the rear axle will not be achieved for a purely linear relation. Hence, proposals have been made to insert valves in the rear-wheel brake circuit which limit or reduce the pressure starting from a predetermined pressure point.

Further, anti-lock brake systems are known. In these brake systems, the rotational behavior of the wheels is monitored by means of sensors. The sensor signals are analyzed and processed to form control signals for a valve assembly composed of electromagnetically operable valves, by which the braking pressure is adjusted such that the wheels will not lock.

Further, German DE-OS 19 61 039 proposes using the solenoid valves not only for anti-lock control, but also for the control of the brake force distribution. To this end, the brake force at the front wheels and at the rear wheels must be measured directly or indirectly. From the comparison between the measured distribution and an optimal distribution, control signals for the solenoid valves of the rear-wheel brakes are derived.

Depending on how the linear brake force distribution inherent in the brake system is designed, it may happen that, on failure of the electronic control, the vehicle will reach an unstable condition during a braking operation because of locking of the rear wheels although the front wheels have not attained the locked condition.

SUMMARY OF THE INVENTION

To avoid this shortcoming, the present invention teaches that, in addition to the first current circuit, there is a second current circuit for the actuating magnet which is provided with a switch, and further that there is a relay which, in its inactive position, closes the second current circuit and interrupts the first current circuit and, in its excited position, closes the first current circuit and interrupts the second current circuit. The advantage of this arrangement is that, on failure of the electronic control for the anti-lock control or the brake force distribution, the second current circuit, which is now activated, will cause the solenoid valve in the connection between the master brake cylinder and the wheel brakes of the rear axle to respond to achievement of a predetermined pressure point in the master cylinder when the switch is a pressure switch, thereby limiting the pressure in the rear-wheel brakes. As a result, a simple brake force distribution, which operates independently of the electronic control, can be achieved with little additional effort.

Instead of a pressure switch, an operating switch, responsive to deceleration, can be used, so that the pressure in the rear-wheel brake is limited at a specific vehicle deceleration.

The present invention shall be explained in more detail with reference to the drawing.

BRIEF DESCRIPTION OF THE DRAWING

The single FIGURE illustrates a preferred embodiment of an automotive vehicle brake system constructed in accordance with the present invention.

DETAILED DESCRIPTION OF THE INVENTION

The system is composed of a master brake cylinder 1 to which wheel brakes 4, 5 are connected via brake lines 2, 3. One inlet valve 6, 7 is inserted into each of the brake lines 2, 3. By way of outlet valves 8, 9, pressure fluid can be discharged from the wheel brakes 4, 5 and delivered back into the brake circuit through the operation of a pump 14.

Inlet valves 6, 7 and outlet valves 8, 9 are electromagnetically operated valves and, upon actuation, the braking pressure in the wheel brakes 4 and 5 can be regulated. The actuating magnets 12, 13 of the inlet valves 6, 7 are illustrated explicitly, and their actuation is explained in more detail hereinbelow. Further, sensors 10 and 11 are provided which determine the wheel rotational behavior.

The valves are controlled by an electronic signal-analyzing and controlling unit 20. This unit has one or more inputs S for the signals which are supplied from the wheel sensors 10 and 11 and are necessary for controlling the valves. Further signals which can be analyzed are the brake forces prevailing at the front and rear axles and the pressure in the front-wheel and rear-wheel brakes. Further, the analyzing unit 20 comprises one or more drivers 28, 28' which provide the actuating current for the valves 6, 7, 8, 9. Only the drivers 28, 28' for the actuating magnets 12, 13 of the inlet valves 6, 7 are illustrated.

The system can include a pressure switch 23 which responds to the pressure in the master brake cylinder. The switch is open in its initial position and will be closed once the pressure in the master brake cylinder reaches a predetermined level. Instead of the pressure switch, the switching operation can be effected by making the switch responsive to deceleration resulting in an elimination of the pressure line shown in the FIGURE by dashed lines. The system also includes a relay 24 with an actuating magnet 25. The various elements are interposed between the positive pole 21 and the zero potential (ground) 22 as follows. A first current circuit 30, 30' leads from the positive pole 21 via the actuating magnets 12, 13 to the drivers 28, 28' and via the relay 24 to the ground 22. A second current circuit 31, 31' leads from the positive pole 21 via the actuating magnets 12, 13 to the pressure switch 23 and to the relay 24 to the ground 22. The relay 24 is driven via a relay circuit 32, the relay circuit being provided with a switch 33 activated by the ignition unit 34.

Because the pressure switch 23 controls both inlet valves 6 and 7, the second current circuits 31 and 31' must be isolated from each other by one diode 26, 27 each, so that switching over of one driver 28, 28' does not result in switching of the inlet valve 7, 6.

The system operates as follows:

The brake force distribution is sensed during a braking operation by means of sensors which are not illustrated herein. Once a discrepancy from the desired brake force distribution occurs, an electronic control operation will be performed. To this end, first the relay circuit 32 is driven, so that the relay 24 switches to assume a position in which the second current circuits 31, 31' are interrupted and the first current circuits 30, 30' are closed.

The control unit 20 can now drive the drivers 28, 28' and further drivers which operate the inlet and outlet valves 6, 7, 8, 9. In this way, the pressure in the wheel brakes 4 and 5 can be adjusted such that the desired brake force distribution is achieved.

Likewise, the rotational behavior of the wheels is constantly monitored by means of the sensors 10 and 11, so that a locking tendency of one of the wheels can be detected. In this case, too, the braking pressure is regulated such that locking of the wheels is prevented.

Should a defective condition be recognized in the electronic control unit 20, in the pump or the sensors, the anti-lock control and the electronic brake force distribution will switch off. As a result, the relay circuit is not energized, so that the relay 24 is in a position in which the first current circuits are opened and the second current circuits are closed. Once a predefined pressure in the master cylinder 1 is reached during braking, the pressure switch 23 will respond and close the second current circuits entirely, so that the magnets 12, 13 respond and the brake lines 2, 3 are interrupted. The pressure in the wheel brakes 4, 5 is thus limited to the level predetermined by the pressure switch. Overbraking of the rear wheels is reliably prevented this way.

A corresponding switching arrangement is formed when a deceleration-responsive switch is employed. The signal of the pressure switch and/or of the deceleration-responsive switch can also be supplied as additional information to the electronic control unit 20.

We claim:

1. A brake system in an automotive vehicle with a device for controlling the braking pressure in wheel brakes, the control being based on signals which are derived from at least one of wheel rotational behavior and brake force distribution, wherein each said wheel brake is furnished with an electromagnetically operated valve which governs the connection between the wheel brake and a master cylinder and an actuating magnet of each said valve is inserted in a first current circuit which is opened and closed, respectively, in dependence on the above-mentioned signals, characterized in that the actuating magnet additionally is inserted in a second current circuit comprising a switch, and in that a relay is provided which, in its inactive position, closes the second current circuit and interrupts the first current circuit, while, in its excited position, it closes the first current circuit and interrupts the second current circuit.

2. A brake system as claimed in claim 1, characterized in that the switch is a pressure switch responding to the master cylinder pressure.

3. A brake system as claimed in claim 1, characterized in that the switch operates deceleration-responsively.

4. A brake system as claimed in claim 1, characterized in that two second current circuits are furnished with one single switch, one diode each being provided for separating said second current circuits.

5. A brake system as claimed in claim 1, characterized in that a third current circuit for controlling the relay is furnished with a switch which is activated by an ignition unit.

6. A brake system in an automotive vehicle for controlling the braking pressure in wheel brakes associated with wheels of said automotive vehicle, said system comprising:

a source of hydraulic fluid;

a plurality of wheel brakes;

first fluid conducting means extending between said hydraulic fluid source and said plurality of wheel brakes for conducting hydraulic fluid to said plurality of wheel brakes;

second fluid conducting means extending between said plurality of wheel brakes and said hydraulic fluid source for conducting hydraulic fluid away from said wheel brakes;

a first plurality of electromagnetically actuated valves in said first fluid conducting means for regulating hydraulic fluid flow to said wheel brakes;

a second plurality of electromagnetically actuated valves in said second fluid conducting means for regulating hydraulic fluid flow away from said wheel brakes;

control means responsive to:
  (a) signals representative of rotational behavior of said wheels of said automotive vehicle, and
  (b) signals representative of brake force distribution among said wheel brakes of said automotive vehicle for developing:
  (a) first control signals in response to said signals representative of rotational behavior of said wheels of said automotive vehicle, and
  (b) second control signals in response to said signals representative of brake force distribution among said wheel brakes of said automotive vehicle;

first circuit means for actuating said first plurality of electromagnetically actuated valves in response to said first control signals;

second circuit means for actuating said first plurality of electromagnetically actuated valves in response to said second control signals;

and switching means for controlling:
  (a) said first circuit means to actuate said first plurality of electromagnetically actuated valves and said second circuit means to inhibit actuation of said first plurality of electromagnetically actuated valves, and
  (b) said second circuit means to actuate said first plurality of electromagnetically actuated valves and said first circuit means to inhibit actuation of said first plurality of electromagnetically actuated valves.

7. A brake system in an automotive vehicle according to claim 6, wherein said switching means include a pressure switch responsive to hydraulic fluid pressure in said hydraulic fluid source.

8. A brake system in an automotive vehicle according to claim 6, wherein said second circuit means include a plurality of branches each of which include one of said electromagnetically actuated valves and a diode for isolating that branch from the others.

9. A brake system in an automotive vehicle according to claim 6, wherein said switching means include a switch responsive to deceleration of said automotive vehicle.

10. A brake system in an automotive vehicle according to claim 6, wherein said switching means are adapted to respond to the ignition unit of said automotive vehicle.

* * * * *